US008608399B2

(12) United States Patent
Schumacher

(10) Patent No.: US 8,608,399 B2
(45) Date of Patent: Dec. 17, 2013

(54) CONNECTION ARRANGEMENT FOR CONNECTING A SICKLE DRIVE TO A SICKLE

(75) Inventor: Heinrich Günter Schumacher, Eichelhardt (DE)

(73) Assignee: Eichelhardter Werkzeug-und Maschinenbau GmbH, Eichelhardt (DE)

( * ) Notice: Subject to any disclaimer, the term of this patent is extended or adjusted under 35 U.S.C. 154(b) by 116 days.

(21) Appl. No.: 12/941,124

(22) Filed: Nov. 8, 2010

(65) Prior Publication Data
US 2011/0110707 A1 May 12, 2011

(30) Foreign Application Priority Data

Nov. 8, 2009 (DE) .......................... 10 2009 053 185
Jul. 5, 2010 (DE) .......................... 10 2010 017 738

(51) Int. Cl.
*F16C 23/08* (2006.01)
(52) U.S. Cl.
USPC .......................................... 403/135; 384/558
(58) Field of Classification Search
USPC ............ 403/26, 134, 135; 384/495–498, 192, 384/206–212, 558; 56/17.6, 279, 298, 304
See application file for complete search history.

(56) References Cited

U.S. PATENT DOCUMENTS 2,048,972 A * 7/1936 Scheffler ........................ 384/498
3,602,560 A * 8/1971 Memmel ........................ 384/126
4,446,683 A * 5/1984 Rempel et al. ................... 56/296
5,097,185 A 3/1992 Ogasawara
5,328,276 A * 7/1994 Linteau .......................... 384/477
5,433,530 A * 7/1995 Waskiewicz .................. 384/206
6,164,829 A * 12/2000 Wenzel et al. ................ 384/203
RE37,484 E * 12/2001 Gerber ............................ 408/56
7,093,981 B2 * 8/2006 Masui et al. .................. 384/558
7,121,074 B1 * 10/2006 Regier et al. .................... 56/296
7,320,548 B2 * 1/2008 Budde .......................... 384/206
7,407,328 B2 * 8/2008 Essam .......................... 384/206
2003/0141872 A1 * 7/2003 Clark et al. .................... 324/339
2007/0209345 A1 * 9/2007 Schumacher et al. .......... 56/12.6

FOREIGN PATENT DOCUMENTS

| CN | 1321114 | 11/2001 |
|---|---|---|
| CN | 101089411 | 12/2007 |
| DE | 40 34 528 | 5/1992 |
| DE | 10 2006 010 825 | 9/2007 |

* cited by examiner

*Primary Examiner* — Joshua Kennedy
(74) *Attorney, Agent, or Firm* — Harness, Dickey & Pierce, P.L.C.

(57) ABSTRACT

A connection arrangement for connecting a sickle drive with a sickle (1) has a connection element (4) on the sickle (1). The connection element (4) has an open ring with a through bore (6) that extends along a longitudinal axis (5). A cup-shaped intermediate element (14) rests in the through bore (6) of the connection element (4). The cup-shaped intermediate element (14) has a spherical inner face (18). A rotational bearing (32) with a spherical outer face (21) is adapted to be accommodated in the spherical inner face (18) in the intermediate element (14).

15 Claims, 5 Drawing Sheets

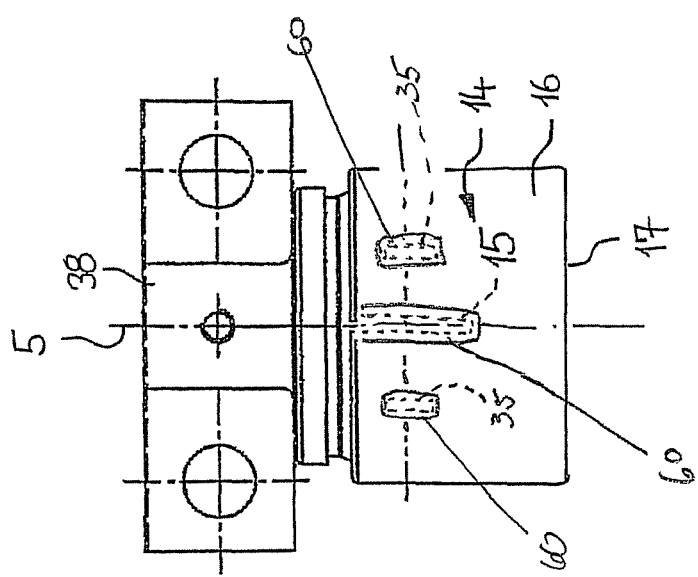

CONNECTION ARRANGEMENT FOR CONNECTING A SICKLE DRIVE TO A SICKLE

CROSS-REFERENCE TO RELATED APPLICATION

This application claims priority to German Patent Application No. 102009053185.8, filed Nov. 8, 2009 and German Patent Application No. 102010017738.5-23, filed Jul. 5, 2010, which applications are herein expressly incorporated by reference.

FIELD

The disclosure relates to a connection arrangement to connect a sickle drive to a sickle.

BACKGROUND

DE 40 34 528 C2 describes a connection arrangement in double sickle bars of front mowers between a sickle drive and a linearly reciprocating sickle. The introduction of the reciprocating movement is achieved, via a pivoting drive lever, and an activated driving trunnion. The driving lever is connected via a spherical bearing to the sickle. The spherical bearing arrangement is necessary, as the driving trunnion is moved by its connection to the drive lever following its pivot movement on a circular path. As the sickle is only linearly guided reciprocatingly movable, the arrangement has to constantly allow for, during operation, a pivot movement of the driving trunnion in relation to the connection element connected to the sickle as well as an axial displacement of the driving trunnion. The connection element that serves to connect to the sickle has a formed ring-like portion and therein a circular cylindrical bore. In this bore, an intermediate ring, closed in a circumferential direction, is accommodated and fixed with its circular cylindrical outer face adapted to the bore. The intermediate ring has a spherical inner face. In this spherical inner face, a bearing ring, which is closed in a circumferential direction, is pivotably movably accommodated with a spherical outer face. The bearing ring has a circular cylindrical through bore. The driving trunnion rests in this through bore displaceably along the axis of the through bore, to be able to compensate for the positional change relative to the displacement axis of the sickle, resulting from the movement of the driving trunnion with the driving lever on a circular path. The whole connection arrangement is inclined, in relation to a longitudinal axis of the driving trunnion, in a direction towards the sickle. To ensure a lubrication chamber for the spherical faces, a lid, which seals the bore downwards, is inserted into the circular cylindrical bore of the connection element in a direction towards the sickle. On the opposite side of the bore, a boot is provided, which seals the bore relative to the driving trunnion.

DE 10 2006 010 825 B4 illustrates a known connection arrangement. It has a connection element on the sickle that is at least partially formed as an open ring and has a through bore extending along a longitudinal axis. Furthermore, an intermediate ring is provided that rests in the through bore of the connection element. It has a spherical inner face and at least one slot on its circumference. In the intermediate element, a rolling member bearing is accommodated with a spherical outer face adapted to the spherical inner face. A disadvantage is that specially sealed rolling member bearings have to be used to ensure a lasting lubrication of the rolling member bearing and to protect this against dirt.

SUMMARY

An object of the disclosure is to provide a connection arrangement between a sickle drive and a sickle. The connection enables a secure retention of the mounting position. The connection provides removal and the renewed mounting with an easy detaching and adaptation to possible changed mounting conditions. Furthermore, the connection enables long durability with a simple construction.

This object is solved according to the disclosure by a connection arrangement for connecting a sickle drive to a sickle that comprises a connection element on the sickle. The connection element has an open ring with a through bore extending along the longitudinal axis. A cup-shaped intermediate element is arranged in the through bore of the connection element. The cup-shaped intermediate element has a spherical inner face. A rotational bearing with a spherical outer face is accommodated to adapt to the spherical inner face in the intermediate element.

The cup-shaped intermediate element provides a simple solution to achieve sealing of the rotational bearing. No separate seals are provided at this position. Especially, as in sickle drives, the intermediate element is arranged such that it opens towards the top. The intermediate element serves as a collection element for the lubricant flowing downwards.

Another advantage in this embodiment is that the connection arrangement is constructed very compact. The rotational bearing is directly pivotably held via the spherical faces in the intermediate element. It is also advantageous that the forces acting on the connection arrangement also are centered on the rotational bearing. An advantageous thermal conduction away from the rotational bearing to the outside is achieved by manufacturing the intermediate element from metal. This is further increased by the direct contact between the individual components that is preferably made from metal. The intermediate element can, however, also be made from plastic. This ensures a simple pressing-on or hammering-on of the intermediate element onto the rotational bearing. To achieve an increased thermal conductivity of the plastic, it can be mixed with metal particles.

An advantageous force absorption is achieved when the rotational rolling member bearing is formed as a double tapered roller bearing.

The cup-shaped intermediate element has a wall extending around the longitudinal axis and a bottom. To facilitate assembly of the intermediate element, it can have, at the side of the wall facing away from the bottom, an opening with a circumferentially extending inner assembly face. The opening expands conically in direction towards an edge of the wall facing away from the bottom.

At least one first slot can be provided in the wall portion. The slot starts at an edge of the wall portion facing away from the bottom. Preferably, several, especially, three first slots are provided. Thus, the intermediate element can be mounted easily on the rotational bearing. Here, the intermediate element is axially pushed onto the rotational bearing and the wall portions between the first slots are bent radially elastically outwards.

To further increase the radial elasticity of the wall, at least one second slot is provided. The at least one second slot is arranged axially off-set to the at least one first slot. The second slot does not extend from the edge and can be provided on the circumference of the wall.

To prevent leakage, the at least one second slot ends within the through bore, when viewed from the edge. Alternatively or additionally, for sealing purposes, the first and/or second slots are filled with a rubber material. The rubber material is vulcanized to the intermediate element. Thus, the slots offer the necessary elasticity and at the same time are sealed to the outside.

The rotational bearing is formed with an accommodation bore to accommodate a driving trunnion of the sickle drive. Preferably, the rotational bearing is formed as a rolling member bearing. The rolling member bearing includes an outer bearing ring with the spherical outer face, an inner bearing ring, with the accommodation bore, and rolling members arranged between the outer bearing ring and the inner bearing ring. The rotational bearing can, however, also be formed as a friction bearing. Here, one individual bearing ring is provided that forms the spherical outer face and the accommodation bore. On the other hand, the rotational bearing in form of a friction bearing can have two bearing rings arranged rotatably relative to each other.

In order to secure the intermediate element on the rotational bearing, tensioning mechanisms are provided to change the cross-section of the through bore of the connection element.

The construction of the connection element as an open ring is preferably achieved by a gap interrupting a first end face and a second end face along the longitudinal axis of the connection element. The gap extends between the first end face and the second end face. In this case, this gap advantageously extends parallel to the longitudinal axis.

To achieve a tightening, the cross-section of the through bore is reduced. The reduction is provided by projecting lugs at both sides of the gap that are drilled through the wall. At least one tensioning screw is aligned in the drilled bore formed on the connection element wall.

In the assembly of the above described intermediate element on the rotational bearing of a connection arrangement, the cup-shaped intermediate element of the connection arrangement delimits, in the mounted condition, a lubricant chamber. The connection arrangement comprises a head bearing holder that has a driving trunnion as well as a lubricating channel. The lubricating channel extends, in the mounted condition of the connection arrangement, from a lubricating channel inlet to the lubricant chamber. The rotational bearing is pushed onto the driving trunnion. The intermediate element is interference fitted on the spherical outer face of the rotational bearing with the lubricant channel opened and used as an air-vent. The intermediate element is clamped within the through bore of the connection element.

After the interference fitting or hammering-on of the intermediate element onto the rotational bearing, the lubricant channel inlet is provided with a lubricating nipple or with a closing element.

Thus, it is ensured, that during the interference fitting of the intermediate element onto the rotational bearing, air can escape from the lubricant chamber through the lubricant channel. Only after this, the lubricant channel is closed. When a lubricating nipple for lubricating the rotational bearing is provided, lubricant or air can escape through a seal on the rotational bearing during greasing.

Further areas of applicability will become apparent from the description provided herein. The description and specific examples in this summary are intended for purposes of illustration only and are not intended to limit the scope of the present disclosure.

DRAWINGS

Preferred embodiments of the disclosure are schematically shown in the drawing wherein:

FIG. 8 is a view like FIG. 7.

DETAILED DESCRIPTION

Figure 1:
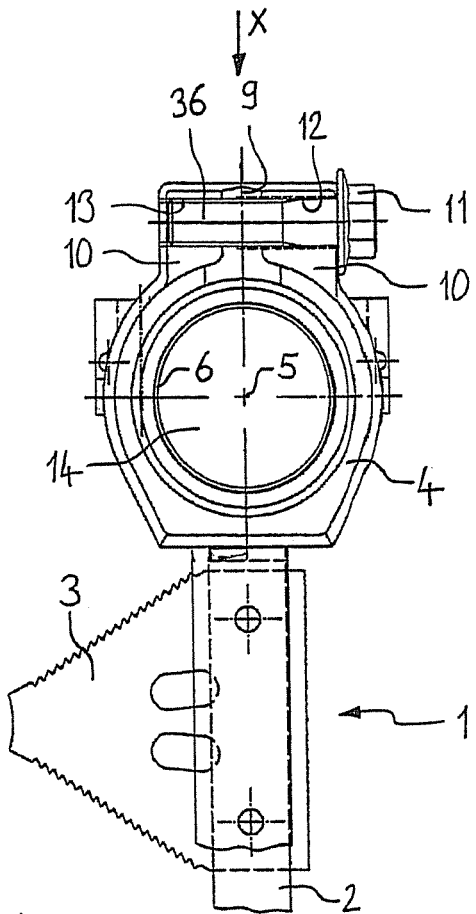
FIG. 1 is a top plan view of a connection arrangement according to the disclosure with the connection to the sickle.
Figure 3:
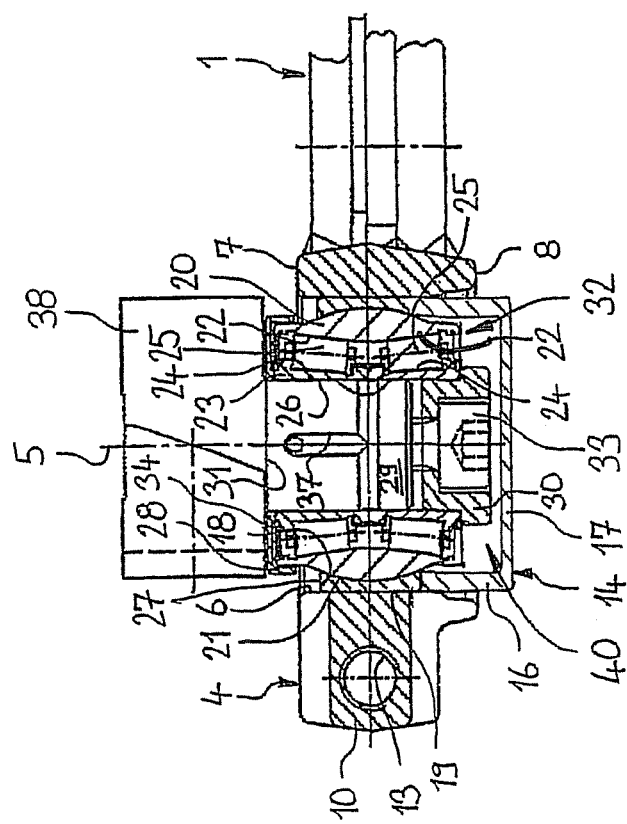
FIG. 3 is a cross-sectional view along a longitudinal axis through the connection arrangement.
Figure 5:
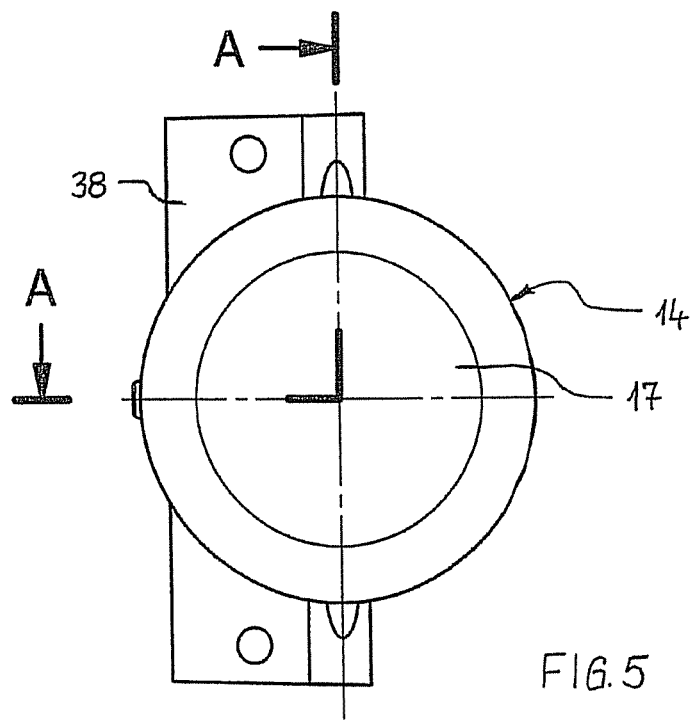
FIG. 5 is a front elevation view of the connection arrangement according to FIG. 4.

FIG. 1 is a portion of a sickle 1 with the knife back 2 and an attached knife blade 3. In the paper plane, an extension of the knife back 2 includes a multitude of such knife blades 3 attached on the knife back 2. The knife back 2 has a connection element 4. The connection element is metallic and is in the form of a sickle head eye. The sickle head eye has a first end face 7, a second end face 8 and a through bore 6. The bore 6 extends through the sickle head between the two end faces 7, 8. The through bore 6 is centered on a longitudinal axis 5 as seen in FIG. 3.

Figure 2:
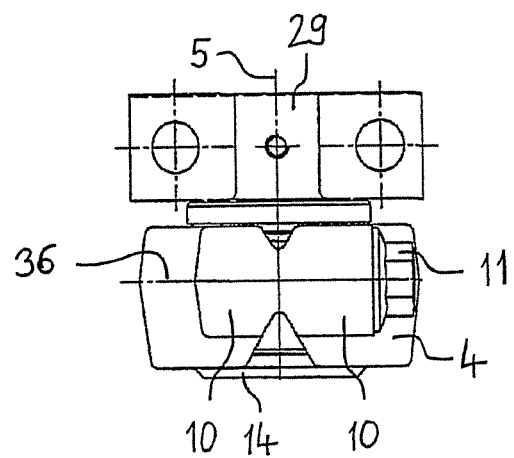
FIG. 2 is an elevation view in the direction of the arrow X of FIG. 1.
Figure 4:
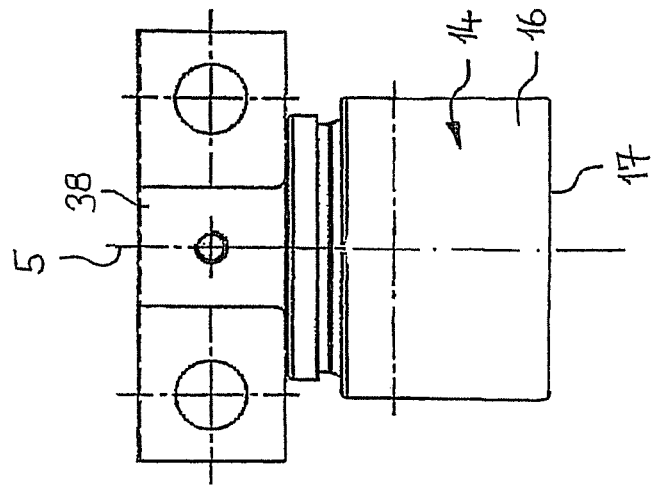
FIG. 4 is a view like FIG. 2 with the connection element removed.

As seen from FIG. 2, the connection element 4 is formed as an open ring. A gap 9 extends between the two end faces 7, 8. The gap 9 extends parallel to the longitudinal axis 5. The gap 9 could, however, also be arranged at an angle to the axis 5.

At both sides of the gap 9, two lugs 10 are arranged and project away from the longitudinal axis 5. One of the two lugs 10 is provided with a through extending bore 12. The bore 12 is arranged on an axis 36 that intersects the longitudinal axis 5 at a distance. A threaded bore 13 is arranged on the axis 36 of the bore 12 in the second lug 10. A tensioning screw 11, especially a head screw, is passed through the bore 12. The screw 11 is screwed into the threaded bore 13 so that it effects a reduction of the cross-section of the through bore 6 depending on how far it is tightened. Here, generally, a through bore can be provided at both sides, through which the tensioning screw is passed and then can be secured with a nut.

As seen in FIGS. 3-6 a metallic intermediate element 14 rests in the circular cylindrical through bore 6. This intermediate element 14 has a wall 16 and a bottom 17. The wall 16 extends circumferentially around the longitudinal axis 5. The bottom 17 close one side the intermediate element 14.

The intermediate element 14 is preferably made from steel. In this case, it is encased with plastic, e.g. insert molded. Generally, other materials can be used, as long as they ensure the required elasticity of the wall portions present between the first slots 15. For example, a plastic material can be used. In order to increase the thermal conductivity, metal particles can, in this case, be embedded in the plastic.

The wall 16 has a spherical inner face 18 and a circular cylindrical outer face 19. The circular cylindrical outer face 19 is accommodated in the circular cylindrical through bore 6 of the connection element 4. Also, it is displaceable along the longitudinal axis 5.

A rotational bearing, formed as rolling member bearing 32 is positioned inside the intermediate element 14. The rotational bearing includes an outer bearing ring 20 that is closed in a circumferential direction and has a spherical outer face 21. The spherical outer face 21 is adapted to the spherical inner face 18 of the intermediate element 14. The outer bearing ring 20 is held pivotably by this arrangement in the intermediate element 14. The assembly of the intermediate element 14 on the outer bearing ring 20 is achieved by means of elastic expansion of the wall 16 of the intermediate element 14. Thus, the intermediate element 14 can be easily and securely mounted on the rolling member bearing 32.

The outer bearing ring 20 has two conical outer races 22 on its inner circumference. The diameter of the outer races 22 decreases towards each other. A two-piece inner bearing ring 23 is provided, as they are common in tapered roller bearings. The inner bearing ring 23 has two inner races 24. Two rows of rolling members 25, in the form of tapered rollers, are arranged in a circumferential direction between the outer races 22 of the outer bearing ring 20 and the inner races 24 of the inner bearing ring 23. The inner bearing ring 24 forms an accommodation bore 26. The accommodation bore 26 has a circular cylindrical configuration. The bore 26 fixedly receives a driving trunnion 29 of the head bearing holder 38 of a sickle drive. The driving trunnion 29 ends in a shoulder 31. The inner bearing ring 23 abuts, via a protection ring 26, the shoulder 31. The inner bearing ring 23 is pressed against the shoulder 31 by an attachment ring 30. The attachment ring 30 is retained by a screw 33. The screw 33 is screwed-in along the longitudinal axis 5 into the driving trunnion 29. Thus, the two bearing rows of the rolling member bearing 32, formed as a conical roller bearing, are pre-tensioned. The rolling member bearing 32 can be made from a metallic material that is acceptable for such bearings and loadings, as they are common in sickle drives. Generally other rolling member bearings, such as a double-row angular contact ball bearing or friction bearings, can be used.

Sealing is achieved at one end by the bottom 17 of the cup-shaped intermediate element 14 and in the direction towards the shoulder 31 by a seal 34 and a protection ring 28. A lubricant chamber 40 is delimited by the cup-shaped intermediate element 14 and by the seal 34. The chamber 40 can be provided with lubricant via a lubricant channel 37 in the driving trunnion 29 of the head bearing holder 38. A lubricating nipple 42 is provided at a lubricant channel inlet 43 that is accessible from the outside as seen in FIG. 6.

The lubricating nipple 42 is not initially inserted into the outlet 43 during assembly of the intermediate element 14. Thus, during the assembly, air can escape from the lubricant chamber 40 through the lubricant channel 37. Only after the assembly, the lubricating nipple 42 is inserted and the lubricant chamber 40 is filled with lubricant. While lubricating the rolling member bearing 32, via the lubricating nipple 42, the lubricant or air can escape through a sealing lip 41 of the seal 34 on the rolling member bearing 32.

Figure 6:
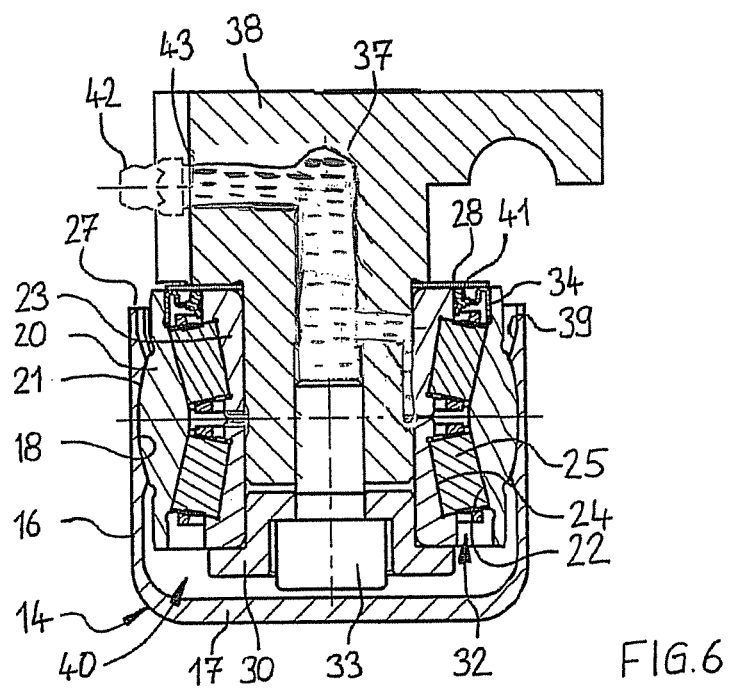
FIG. 6 is a sectional view along the intersection line A-A of FIG. 5.

The edge 27 of the intermediate element 14 becomes especially evident from FIG. 6. On the side, facing away from the bottom 17, an opening includes a circumferentially extending inner assembly face 39 in the wall 16. The assembly face 39 expands conically in direction to the edge 27 of the wall 16, facing away from the bottom 17. The assembly face 39 facilitates the attachment and the pressing-on of the intermediate element 14 onto the outer bearing ring 20 of the rolling member bearing 32. The assembly face 39 supports the radial expansion of the wall 16 during the assembly on the outer bearing ring.

The driving trunnion 29 can be fixed corresponding to the assembly conditions in the correct position in the pivot direction arranged on the longitudinal axis 5 around the pivot centre, formed by the spherical inner face 28 and the spherical outer face 20. The position of the intermediate element 14 can be adjusted along the axis of the through bore 6 such that the tensioning mechanism in the form of the tensioning screw 11 is tightened. Thus, the cross-section of the through bore 6 is reduced. Accordingly, a radial force acts on the intermediate element 14. Since the intermediate element 14, itself, is radially elastic, the diameter of the intermediate element 14 can also be reduced. This presses the spherical inner face 18 against the spherical outer face 24 of the outer bearing ring 20. Thus, this is fixed. The outer bearing ring 20 is selected, concerning its dimensions, such that it is does not deform. Thus, it has no effect on the bearing play and the operational conditions of the rolling member bearing due to the pressing-on.

The intermediate element 14 is formed from a metal and especially from steel. The steel is elastic so that it can return to its original shape where the slot in the relaxed condition has its largest width. The clamping effect is effectively cancelled after the loosening of the tensioning screw and a renewed smooth-running adjustment is possible.

Figure 7:
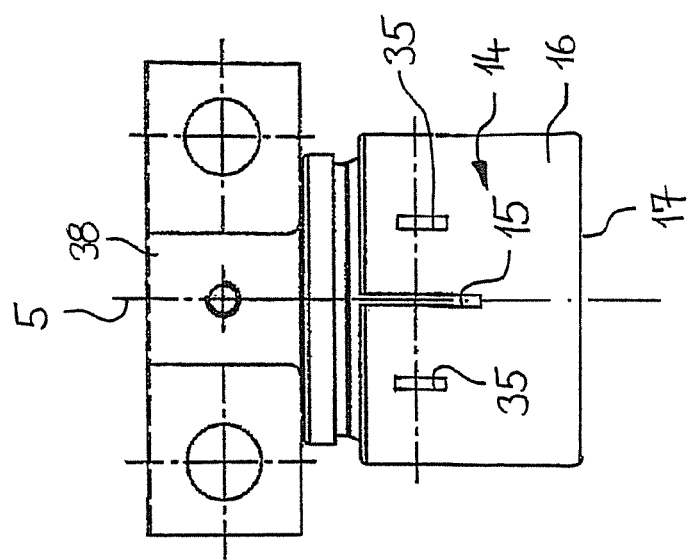
FIG. 7 is an elevation view like FIG. 4 with an alternative embodiment of an intermediate element with slots.

In FIG. 7, an alternative embodiment of an intermediate element 14 is shown. Slots 15, 35 are provided to increase the radial elasticity of the intermediate element 14. The wall 16 has, starting from an edge 27 facing away from the bottom 17, at least one, preferably at least three first slots 15. These first slots 15 are arranged parallel to the longitudinal axis 5 distributed along the circumference of the wall 16. However, the slots can extend at an angle to the longitudinal axis 5.

To increase further the elasticity of the wall 16, two slots 35 are provided along the circumference. The slots 35 are arranged off-set to the first slots 15 such, that these do not start from the edge 27. To prevent a leakage of lubricant, the first slots 15 as well as the second slots 35 end, when seen from the edge 27, within the through bore 6. Alternatively, the slots 15, 35 can also be filled with a rubber material 60. The rubber material is vulcanized to the intermediate element 14. Thus, the slots 15, 35 offer the necessary elasticity and are, at the same time, sealed to the outside.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A connection arrangement for connecting a sickle drive to a sickle comprising:
   a connection element, the connection element has two sides with an open ring with a through bore that extends from side to side along a longitudinal axis;
   a one piece cup-shaped intermediate element, defining a longitudinal axis, is arranged in the through bore of the connection element, the one-piece cup-shaped intermediate element is insertable into the through bore from either side of the connection element, the one piece cup-shaped intermediate element includes a closed bottom and a wall continuous with the closed bottom, the wall extends circumferentially around the longitudinal axis, the wall has a spherical inner face formed in an inner wall surface; and
   a rotational bearing with a spherical outer face is adapted to accommodate to the spherical inner face in the intermediate element.

2. The connection arrangement according to claim 1, wherein the cup-shaped intermediate element is made from a metallic material.

3. The connection arrangement according to claim 1, wherein the cup-shaped intermediate element is made from plastic or a plastic mixed with metallic particles.

4. The connection arrangement according to claim 1, wherein the cup-shaped intermediate element wall extends around the longitudinal axis and a bottom.

5. The connection arrangement according to claim 4, wherein on the side facing away from the bottom, the wall is provided with an opening with a circumferentially extending inner assembly face, the inner assembly face expands conically in direction to an edge of the wall facing away from the bottom.

6. The connection arrangement according to claim 4, wherein at least one first slot is provided in the wall, the first slot starts from an edge of the wall facing away from the bottom.

7. The connection arrangement according to claim 6, wherein at least one second slot is provided in the wall, which is arranged axially off-set to the at least one first slot.

8. The connection arrangement according to claim 7, wherein the at least one second slot is covered by the through bore.

9. The connection arrangement according to claim 7, wherein the slots are filled with a rubber material.

10. The connection arrangement according to claim 1, wherein the rotational bearing has an accommodation bore for accommodating a driving trunnion of the sickle drive.

11. The connection arrangement according to claim 1, wherein the rotational bearing is formed as a rolling member bearing with an outer bearing ring, including the spherical outer face, an inner bearing ring that has the accommodation bore, and rolling members arranged between the outer bearing ring and the inner bearing ring.

12. The connection arrangement according to claim 1, wherein a tensioning mechanism is provided for changing the cross-section of the through bore of the connection element.

13. A connection arrangement for connecting a mowing sickle drive to a mowing sickle, comprising:
a connection element integral with the mowing sickle or connected to the mowing sickle, the connection element includes an open ring with a through bore extending along a longitudinal axis;
an intermediate element rests in the through bore of the connection element, the intermediate element includes a spherical inner face;
a rotational bearing including a spherical outer face adapted to accommodate with the intermediate element spherical inner face, the spherical inner face and the spherical outer face are formed such that the rotational bearing is held in the intermediate element;
the intermediate element is one piece and has a pot-shaped configuration, including a wall, extending circumferentially around a longitudinal axis, and a closed bottom, the wall is continuous with the closed bottom, the intermediate element is clamped by the connection element by the open ring within the through bore of the connection element, the wall including the spherical inner face formed in an inner surface of the wall, the wall is formed such that the intermediate element is mountable on the rotational bearing by elastically expanding the wall.

14. A sickle with a connection arrangement for connecting a sickle drive to a sickle comprising:
a connection element on the sickle, the connection element has an open ring with a through bore that extends along a longitudinal axis;
a one piece cup-shaped intermediate element, defining a longitudinal axis, is arranged in the through bore of the connection element, the one piece cup-shaped intermediate element is clamped by the connection element by the open ring within the through bore of the connection element, the one piece cup-shaped intermediate element has a closed bottom and a wall continuous with the closed bottom, the wall extends circumferentially around the longitudinal axis, a spherical inner face is formed in an inner surface of the wall; and
a rotational bearing with a spherical outer face is adapted to accommodate to the spherical inner face in the intermediate element.

15. A connection arrangement for connecting a sickle drive to a sickle comprising:
a connection element, the connection element has an open ring with a through bore that extends along a longitudinal axis;
a one piece cup-shaped intermediate element, defining a longitudinal axis, is arranged in the through bore of the connection element, the one piece intermediate element is fixed to the connection element solely by being clamped by the open ring within the through bore of the connection element, the one piece cup-shaped intermediate element includes a closed bottom and a wall continuous with the closed bottom, the wall extends circumferentially around the longitudinal axis, the wall has a spherical inner face formed in an inner wall surface; and
a rotational bearing with a spherical outer face is adapted to accommodate to the spherical inner face in the intermediate element.

* * * * *